W. F. NORMAN.
TRAVELING CEILING FAN FOR TUNNEL DRIERS.
APPLICATION FILED FEB. 28, 1916.
1,221,365.
Patented Apr. 3, 1917.
2 SHEETS—SHEET 1.
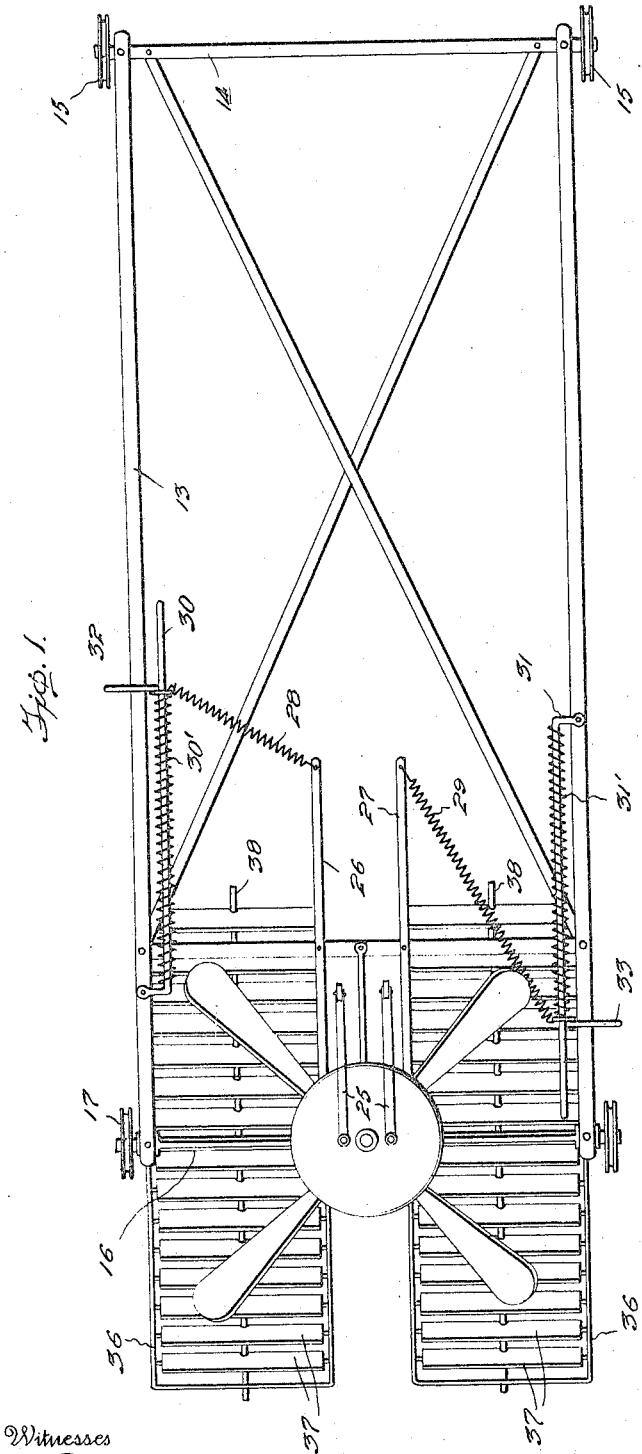
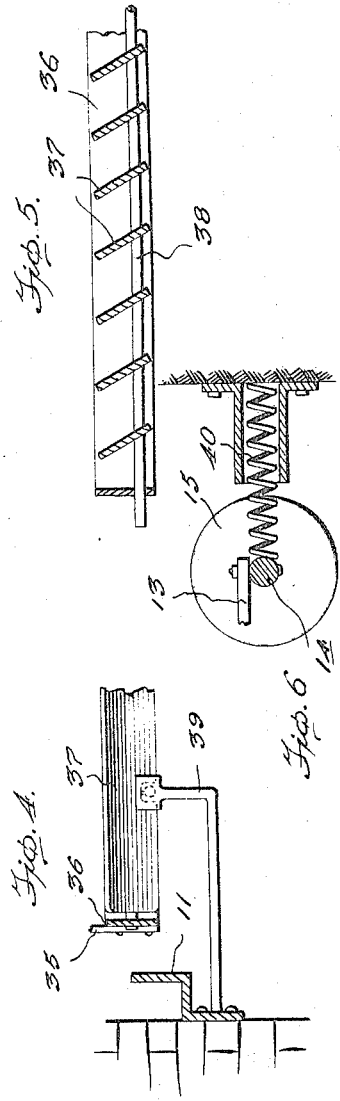
Witnesses
Paul M. Hunt
R. M. Roberts
Inventor
Wm. F. Norman.
By David P. Moore
Attorney W. F. NORMAN.
TRAVELING CEILING FAN FOR TUNNEL DRIERS.
APPLICATION FILED FEB. 28, 1916.
1,221,365.
Patented Apr. 3, 1917.
2 SHEETS—SHEET 2.
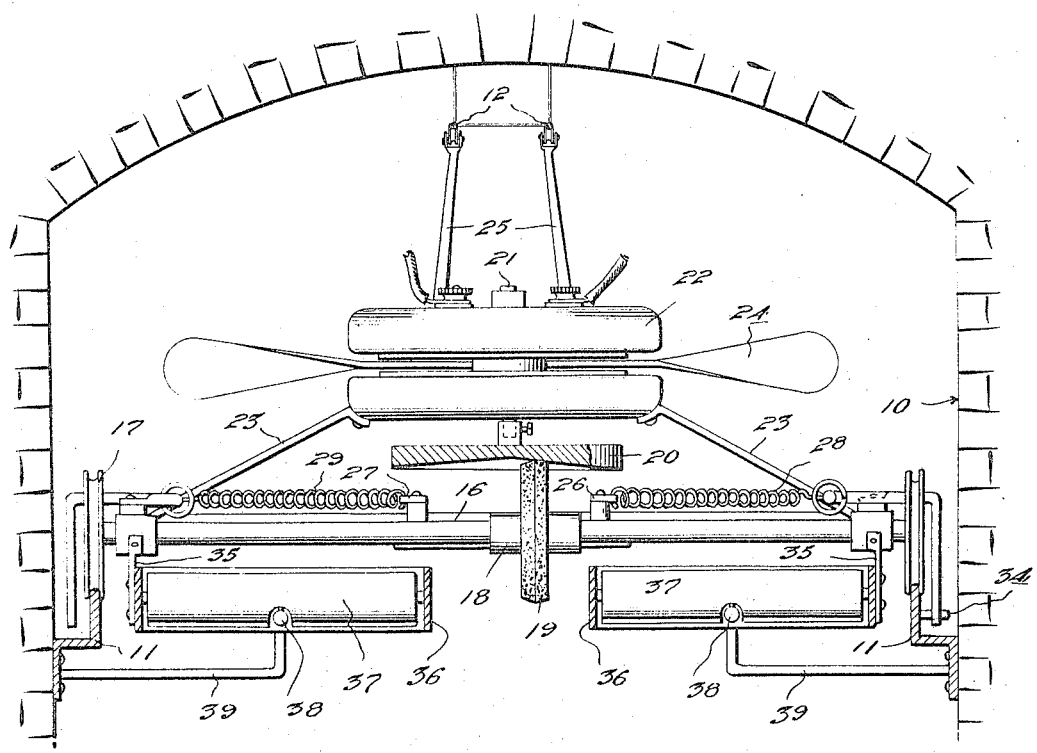
Fig. 2.
Fig. 3.
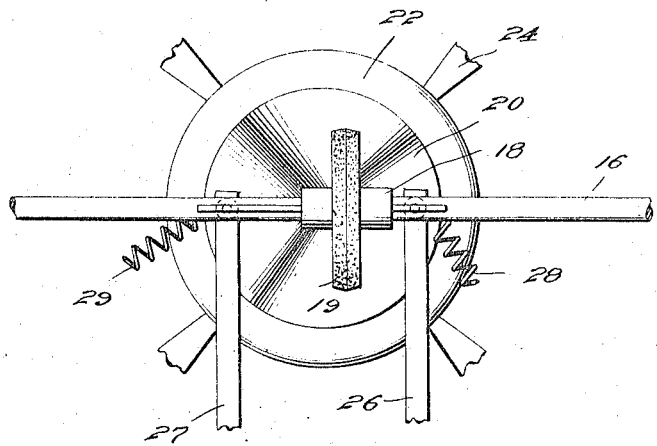
Witnesses
Paul M. Hunt
Inventor
Wm F. Norman
By David P. Moore
Attorney

UNITED STATES PATENT OFFICE.

WILLIAM F. NORMAN, OF NEVADA, MISSOURI.

TRAVELING CEILING-FAN FOR TUNNEL-DRIERS.

1,221,365.

Specification of Letters Patent.

Patented Apr. 3, 1917.

Application filed February 28, 1916. Serial No. 81,064.

Be it known that I, WILLIAM F. NORMAN, a citizen of the United States, residing at Nevada, in the county of Vernon and State of Missouri, have invented certain new and useful Improvements in Traveling Ceiling-Fans for Tunnel-Driers, of which the following is a specification, reference being had therein to the accompanying drawing.

This invention relates to improvements in traveling ceiling fans for tunnel driers, one object of the invention being the provision of an electric motor and fan mounted upon a car or truck and having coöperable means whereby the truck is driven through the instrumentality of the motor, there being carried by the truck louvers which direct the air upon the material being dried within the tunnel, while further mechanism is provided for causing a reversal of movement between the driven element of the truck and the motor shaft so that the fan motor will cause the truck to move in both directions in the tunnel.

A further object of this invention is the provision of a fan and louver carrying member which can be readily mounted within drying tunnels and which is provided with means for receiving the current from controlling wires located in the tunnel so that the fan motor may be operated as desired and to cause the truck to travel back and forth automatically.

A still further object of this invention is the provision of a comparatively simple and inexpensive arrangement of a fan and motor, as well as reversing mechanism for a traveling mechanism and one which is easily installed in the present drying tunnels.

In the accompanying drawings:—

Figure 1 is a top plan view of the complete truck and fan arrangement.

Fig. 2 is a view partly in cross section and partly in elevation of the complete apparatus in position within a tunnel.

Fig. 3 is a bottom plan view of the drive and reversing mechanism for the driving shaft of the truck.

Fig. 4 is a detail view of the louver shift mechanism.

Fig. 5 is a detail sectional view showing the method of mounting the louvers.

Fig. 6 is a detail view of one of the spring bumpers at the end of the tunnel.

Referring to the drawings, the numeral 10 designates the tunnel proper which is provided with the trackways 11 at opposite sides thereof and with the trolleys 12 adjacent the top thereof.

The traveling mechanism comprises the truck 13, having the fixed shaft 14 upon which are mounted the grooved wheels 15 and the drive shaft 16 carrying the grooved wheels 17.

Mounted for sliding movement, but rotatively with the shaft 16 is a sleeve 18 carrying the friction drive wheel 19 which is adapted to be in frictional engagement with the driving disk 20 which is fast to the shaft 21 of the electric motor 22, said motor being supported upon the truck frame through the instrumentality of the braces 23. The motor 22 has attached to this shaft the fan 24 which is so arranged as to draw the air from above and drive the same downwardly through the frame of the truck upon the material to be dried in the lower portion of the tunnel.

Carried by the motor 22 are the trolley poles 25 which are adapted to be in engagement with the trolley wires 12 so that current may be supplied to the motor 22.

Where so desired, conductors may be led from one of the trolley poles to a distant point and then to the motor 22 so that such motor may be controlled at pleasure, or the switch for controlling the current may be interposed between the trolleys 12. In fact, any electric arrangement that will properly supply or control the current to the motor 22 may be employed without departing from the spirit of this invention.

It will thus be seen that as the fan 24 is operated, the disk 20 will also be rotated and through its frictional engagement with the drive 19, rotate the drive shaft 16 so as to propel the truck on the rails 11.

In order to provide for a reverse movement of the truck, it is essential that the drive member 19 be moved from one side of the center of the disk 20 to the opposite side, and to perform this action, I provide the two shifting levers 26 and 27 which are connected through the springs 28 and 29 to the cushioning springs 30' and 31' of the arms 30 and 31, provided with the respective depending fingers 32 and 33 for coöperation with the stops 34 carried by the respective rails 11 and located one at each end of the tunnel.

The respective levers 26 and 27 are pivoted intermediate of their ends so that the ends adjacent the shaft 16 are disposed to, at the proper time, abut the sleeve 18 of the drive member 19 so that the same will be moved transversely of the disk 20, the free ends of the respective levers 26 and 27 receiving movement in the following manner.

At one end of the tunnel, one cam 34 is provided for engaging the depending finger 32, while at the opposite end of the tunnel the other rail 11 is provided a similar cam (not shown) for engaging the depending finger 33.

Thus assuming that the truck is moving to the right as viewed in Fig. 1, the finger 32 will engage its operating cam 34, and the lever 30 will be moved outwardly, and with it the spring 30' which in turn provides with the spring 28 a resilient connection between the levers 30 and 26. This movement will pull the outer end of the lever 26 away from the center of the truck and cause the inner end thereof above the shaft 16 to be moved to engage one end of the sleeve 18 so that the friction disk 19 will be moved from the right as viewed in Fig. 2 to the left, and consequently over and beyond the center of the disk 20, the direction of travel of the disk 19 thus being reversed so that the shaft 16 is reversed and the truck is moved in the opposite direction or toward the left as viewed in Fig. 1.

The release of the finger 32 from its cam 34 will permit the springs 30' and 28 to cause the levers 30 and 26 to assume the normal position as illustrated in Fig. 1. As the truck approaches the opposite end of the tunnel, the finger 33 is placed in engagement with its cam and the lever 31 is pulled outwardly so that the springs 31' and 29 actuate the lever 27 to cause the disk 19 to be moved in the opposite direction to that heretofore described so that the drive disk 20 will impart a reverse movement to the shaft 16 and the truck will be moved toward the right as viewed in Fig. 1.

Supported from the truck frame 13 are the depending arms 35 and the louver carrying frames 36 which may be of any desired construction, while mounted in such frame are the louvers 37 which are connected for simultaneous movement through the rod 38 which projects from beyond the ends of the frame and in the path to be engaged by the shift arms 39 which are mounted fixedly to the rails or trackways 11 and projected in the path to have their free ends engage such shift rods 38. By this means the louvers 37 are shifted at the end of each movement of the truck within the tunnel so that the air will be properly directed downwardly upon the articles to be dried.

Mounted to act as a spring buffer or bumper for the truck and to abut either the frame or any part of the truck is an incased buffer spring 40 as illustrated in detail in Fig. 6, it there being shown as disposed in the path to engage the shaft 14.

It is evident that various minor changes may be made in the structure and details of the mechanism without departing from the spirit of the invention.

It is also apparent that by adjusting the stops and bumpers at the ends of the tunnel, the fan may be made to travel any desired distance within the tunnel.

It is also apparent that although the present apparatus has been shown as used in a tunnel drier, it is possible to employ the same in a drying room, or in any place where it would be useful.

The louvers may be removed where they are of no advantage, and it is also possible to set them in a fixed position, which will cause the air to be driven or directed in any desired direction, as for instance in front of the truck toward the stack or exit end of the tunnel. In the summer time when artificial heat is not used and when both ends of the tunnel are open, the reversible louvers are desirable, the current of air always being directed in front of the motor as it travels, thus driving the moist air out of each end of the tunnel in advance of the truck.

What I claim as new is:

1. In a device of this character, the combination of a truck having a drive shaft, a motor frame supported upon the truck above the drive shaft, a slidable friction disk mounted upon the drive shaft for rotation therewith, a driving friction disk connected to the motor and frictionally engaging the first drive disk, a fan operably connected to the motor, two levers mounted upon the truck and disposed to have their inner ends upon opposite sides of the slidable disk, two additional levers disposed in opposite directions and mounted upon the truck at opposite sides of the truck, each of said levers being provided with a depending finger, and resilient connections between the opposite ends of the first two levers and the respective last mentioned levers, whereby the actuation of either one of the last mentioned levers will cause the shifting of the slidable disk.

2. In a device of this character, the combination of a truck having a drive shaft, a motor frame supported upon the truck above the drive shaft, a slidable friction disk mounted upon the drive shaft for rotation therewith, a driving friction disk connected to the motor and frictionally engaging the first drive disk, a fan operably connected to the motor, two levers mounted upon the truck and disposed to have their inner ends upon opposite sides of the slidable disk, two additional levers disposed in opposite directions and mounted upon the truck at opposite sides of the truck, each of said levers being provided with a depending finger, resilient connections between the opposite ends of the first two levers and the respective last mentioned levers, whereby the actuation of either one of the last mentioned levers will cause the shifting of the slidable disk, and a plurality of shifting louvers mounted below the truck and beneath the fan to receive the air currents from the fan.

3. The combination with a trackway, two projections one adjacent each end thereof, and current supplying means, of a truck mounted upon the trackway and having a drive shaft, an electric motor mounted upon the truck above the drive shaft, a trolley connection carried by the motor for engagement with the current supplying means, a fan connected to the motor, a friction disk also connected to the motor, a shiftable friction disk splined upon the drive shaft and having its periphery in contact with the first disk, a pair of shifting levers pivoted to the truck and having their inner ends one upon each side of the shiftable disk, two oppositely disposed levers pivoted to the sides of the truck, a depending finger carried adjacent the free end of each of the latter levers, a coil spring mounted upon each of the latter levers and limited in its outer movement by the finger, and a spring connected to the coil spring adjacent said finger and to the free end of its respective shifting lever, whereby as the finger engages one of the trackway projections the levers are operated to actuate the shifting disk.

4. The combination with a trackway, two projections one adjacent each end thereof, and current supplying means, of a truck mounted upon the trackway and having a drive shaft, an electric motor mounted upon the truck above the drive shaft, a trolley connection carried by the motor for engagement with the current supplying means, a fan connected to the motor, a friction disk also connected to the motor, a shiftable friction disk splined upon the drive shaft and having its periphery in contact with the first disk, a pair of shifting levers pivoted to the truck and having their inner ends one upon each side of the shiftable disk, two oppositely disposed levers pivoted to the sides of the truck, a depending finger carried adjacent the free end of each of the latter levers, a coil spring mounted upon each of the latter levers and limited in its outer movement by the finger, a spring connected to the coil spring adjacent said finger and to the free end of its respective shifting lever, whereby as the finger engages one of the trackway projections the levers are operated to actuate the shifting disk, two sets of pivoted louvers depending from the under side of the truck adjacent the motor and fan, and coöperative means carried by the respective louvers and by the trackway for shifting the louvers.

In testimony whereof I affix my signature.

WILLIAM F. NORMAN.